US009800610B1

United States Patent
Lu (10) Patent No.: US 9,800,610 B1
(45) Date of Patent: Oct. 24, 2017

(54) SYSTEMS AND METHODS FOR DEFEATING RELAY ATTACKS

(71) Applicant: Symantec Corporation, Mountain View, CA (US)

(72) Inventor: Jin Lu, Oak Park, CA (US)

(73) Assignee: Symantec Corporation, Mountain View, CA (US)

( * ) Notice: Subject to any disclaimer, the term of this patent is extended or adjusted under 35 U.S.C. 154(b) by 28 days.

(21) Appl. No.: 14/850,989

(22) Filed: Sep. 11, 2015

(51) Int. Cl.
H04L 29/06 (2006.01)

(52) U.S. Cl.
CPC ...... *H04L 63/1466* (2013.01); *H04L 63/1416* (2013.01)

(58) Field of Classification Search
CPC .............. H04L 63/1466; H04L 63/1416; H04L 63/0853; H04W 4/008; H04W 12/08
See application file for complete search history.

(56) References Cited

U.S. PATENT DOCUMENTS

| | | | | |
|---|---|---|---|---|
| 6,208,239 | B1 * | 3/2001 | Muller | B60R 25/24 340/10.1 |
| 8,442,719 | B1 * | 5/2013 | Nowottnick | G07C 9/00309 701/36 |
| 2014/0375420 | A1 * | 12/2014 | Seiberts | B60R 25/2072 340/5.31 |
| 2016/0200291 | A1 * | 7/2016 | Kim | B60R 25/30 701/2 |
| 2016/0332597 | A1 * | 11/2016 | Tokunaga | B60R 25/24 |

OTHER PUBLICATIONS

Bilton, Nick, "Keeping Your Car Safe From Electronic Thieves", http://mobile.nytimes.com/2015/04/16/style/keeping-your-car-safe-from-electronic-thieves.html?referrer=&_r=0, as accessed Aug. 3, 2015, The New York Times, (Apr. 15, 2015).
Brain, Marshall, "How Remote Entry Works", http://auto.howstuffworks.com/remote-entry.htm, as accessed Aug. 3, 2015, HowStuffWorks.com, (Aug. 15, 2001).
Frenzel, Lou, "The Fundamentals of Short-Range Wireless Technology", http://electronicdesign.com/communications/fundamentals-short-range-wireless-technology, as accessed Aug. 3, 2015, Electronic Design, (Oct. 11, 2012).

* cited by examiner

*Primary Examiner* — Edward Zee
*Assistant Examiner* — Chi Nguy
(74) *Attorney, Agent, or Firm* — FisherBroyles, LLP (57) ABSTRACT

The disclosed computer-implemented method for defeating relay attacks may include (1) buffering, in a memory buffer, an encoded signal that has been sent to a remote device, (2) detecting, within a time interval of the encoded signal being sent, a second signal that corresponds to the encoded signal, (3) determining that a strength of the second signal is above a predetermined threshold, (4) determining, based on the strength of the second signal being above the predetermined threshold, that the second signal represents a relay attack, and (5) initiating a security action to defeat the relay attack. Various other methods, systems, and computer-readable media are also disclosed.

20 Claims, 7 Drawing Sheets

SYSTEMS AND METHODS FOR DEFEATING RELAY ATTACKS

BACKGROUND

Short-range wireless communication has been employed in a variety of applications over many years. One widely used application is remote keyless entry (RKE), which now comes as a standard feature in most vehicles. Another is a garage door opener remote control, which allows a driver to open a garage door without leaving a vehicle. Many other applications of short-range wireless technology are coming into widespread use and others are expected to make this technology a feature of many devices in the home, workplace, and public spaces. Many of these applications may be described as monitoring and control systems, such as temperature monitors, thermostats, security systems, utility meters, vehicle operation monitors, machine tool controls, and robotic controls. Short-rage wireless technologies include, without limitation, ANT WIRELESS ANT/ANT+, BLUETOOTH, industrial, scientific, and medical (ISM) band radio, Wireless USB, and Z-Wave.

Most short-range wireless applications are designed to operate in the range of less than 10 meters. For example, RKE systems are intended to be used when the driver is within sight of the vehicle, either approaching or departing. While there may be times that it would be advantageous to be able to unlock a vehicle from a greater distance (such as when the driver has lost the key), the short-range operation of RKE systems may be considered a security feature, allowing a vehicle door to be unlocked only when the driver is close to the vehicle.

While providing many benefits, particularly convenience, devices that use short-range wireless communication are vulnerable to a type of attack variously known as a relay attack or "amplification-in-the-middle" (AITM) attack. In a relay attack, a transceiver receives a weak signal originating outside the range of the intended receiving device. The transceiver rebroadcasts (and sometimes amplifies) the signal, which may then be received by the intended device. Depending on the design of the wireless system, the originating and receiving devices may communicate further as part of an authentication or function control process. The transceiver may receive, amplify, and retransmit each of these communications until the transceiver operator has obtained the desired access, such as a vehicle door being unlocked.

As the number of short-range wireless systems continues to grow, the potential harm that may result from relay attacks may increase proportionally. Accordingly, what is needed are systems and methods for defeating relay attacks.

SUMMARY

As will be described in greater detail below, the instant disclosure describes various systems and methods for defeating relay attacks by comparing the strength and content of received signals to a transmitted signal. After transmitting a signal, if the computing device receives a signal identical in content and at a signal strength greater than would be expected from a signal echo, systems and methods described herein may determine that the received signal represents a relay attack.

In one example, a computer-implemented method for defeating relay attacks may include (1) buffering, in a memory buffer, an encoded signal that has been sent to a remote device, (2) detecting, within a time interval of the encoded signal being sent, a second signal that corresponds to the encoded signal, (3) determining that a strength of the second signal is above a predetermined threshold, (4) determining, based on the strength of the second signal being above the predetermined threshold, that the second signal represents a relay attack, and (5) initiating a security action to defeat the relay attack.

In some examples, detecting the second signal that corresponds to the encoded signal may include comparing content of the second signal to content of the encoded signal in the memory buffer and determining that the content of the second signal is identical to the content of the encoded signal. In one embodiment, the second signal is received at a frequency of the encoded signal such that the second signal may interfere with reception of the encoded signal by the remote device.

In one embodiment, the computer-implemented method may further include (1) transmitting a second encoded signal to the remote device, (2) detecting, within a time interval of sending the second encoded signal, a third signal, where the third signal is received at a frequency of the second encoded signal and may interfere with reception of the second encoded signal by the remote device, and (3) detecting a fourth signal, where content of the fourth signal is identical to the content of the encoded signal.

In one embodiment, the encoded signal includes a value in a code sequence and the second encoded signal includes a subsequent value in the code sequence. In one embodiment, the computer-implemented method may further include calculating, based on the strength of the second signal, an estimated distance of a signal relay device from the computing device. In one embodiment, the security action may include (1) notifying an administrator of the relay attack, (2) broadcasting an audible alarm, (3) denying access to a function controlled by the computing device, and/or (4) activating a secondary security system.

In one embodiment, a system for implementing the above-described method may include several modules stored in memory, such as (1) a buffering module that buffers, in a memory buffer, an encoded signal that has been sent to a remote device, (2) a detection module that detects, within a time interval of the encoded signal being sent, a second signal that corresponds to the encoded signal, (3) an analysis module that (a) determines that a strength of the second signal is above a predetermined threshold and (b) determines, based on the strength of the second signal being above the predetermined threshold, that the second signal represents a relay attack, and (4) a security module that initiates a security action to defeat the relay attack. The system may also include at least one physical processor configured to execute the buffering module, the detection module, the analysis module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) buffer, in a memory buffer, an encoded signal that has been sent to a remote device, (2) detect, within a time interval of the encoded signal being sent, a second signal that corresponds to the encoded signal, (3) determine that a strength of the second signal is above a predetermined threshold, (4) determine, based on the strength of the second signal being above the predetermined threshold, that the second signal represents a relay attack, and (5) initiate a security action to defeat the relay attack.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for defeating relay attacks. As will be explained in greater detail below, systems and methods described herein may detect relay attacks by comparing the content of received signals with the content of transmitted signals. If a received signal contains the same content as a transmitted signal, at a signal strength greater than would be expected with a signal echo, systems and methods described herein may determine that the received signal indicates that a relay attack is in progress. After detecting a relay attack, systems and methods described herein may initiate an appropriate security action to defeat the relay attack. Systems and methods described herein may be applied to defeat relay attacks directed toward systems employing various forms of short-range wireless communication.

The following will provide, with reference to FIGS. 1, 2, 4, and 5, detailed descriptions of exemplary systems for defeating relay attacks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

Figure 1:
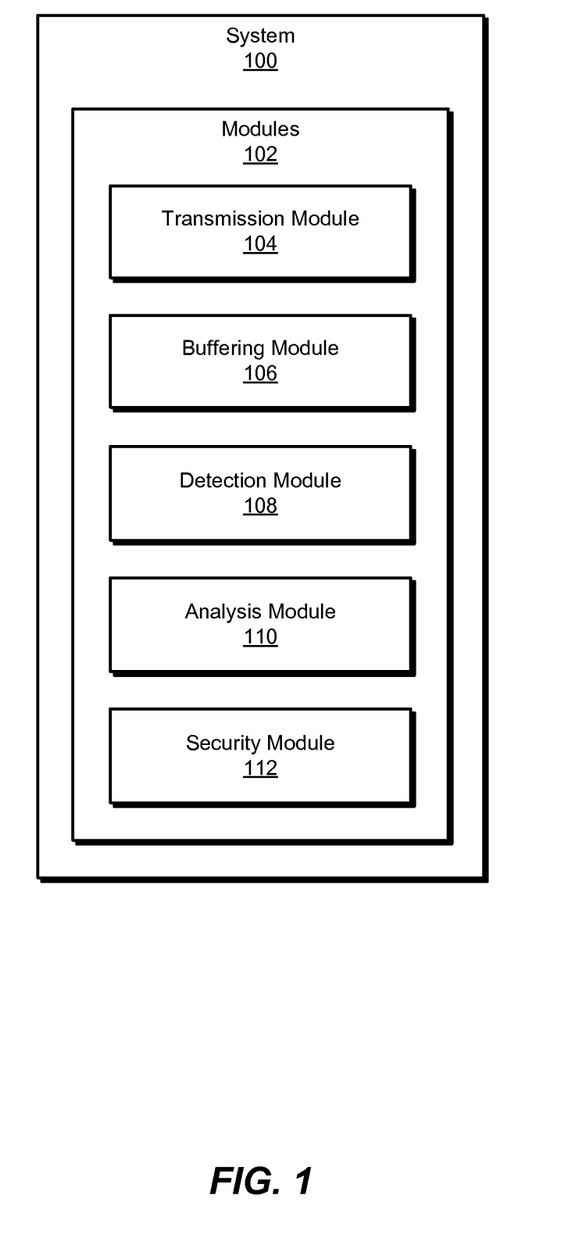
FIG. 1 is a block diagram of an exemplary system for defeating relay attacks.

FIG. 1 is a block diagram of an exemplary system 100 for defeating relay attacks. As illustrated in this figure, exemplary system 100 may include one or more modules 102 for performing one or more tasks. For example, and as will be explained in greater detail below, exemplary system 100 may include a transmission module 104 that transmits an encoded signal to a remote device, a buffering module 106 that buffers, in a memory buffer, the encoded signal. Exemplary system 100 may additionally include a detection module 108 that detects, within a time interval of the encoded signal being sent, a second signal that corresponds to the encoded signal. Exemplary system 100 may also include an analysis module 110 that determines that a strength of the second signal is above a predetermined threshold. Exemplary system 100 may additionally include a security module 112 that initiates a security action to defeat the relay attack. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or remote device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
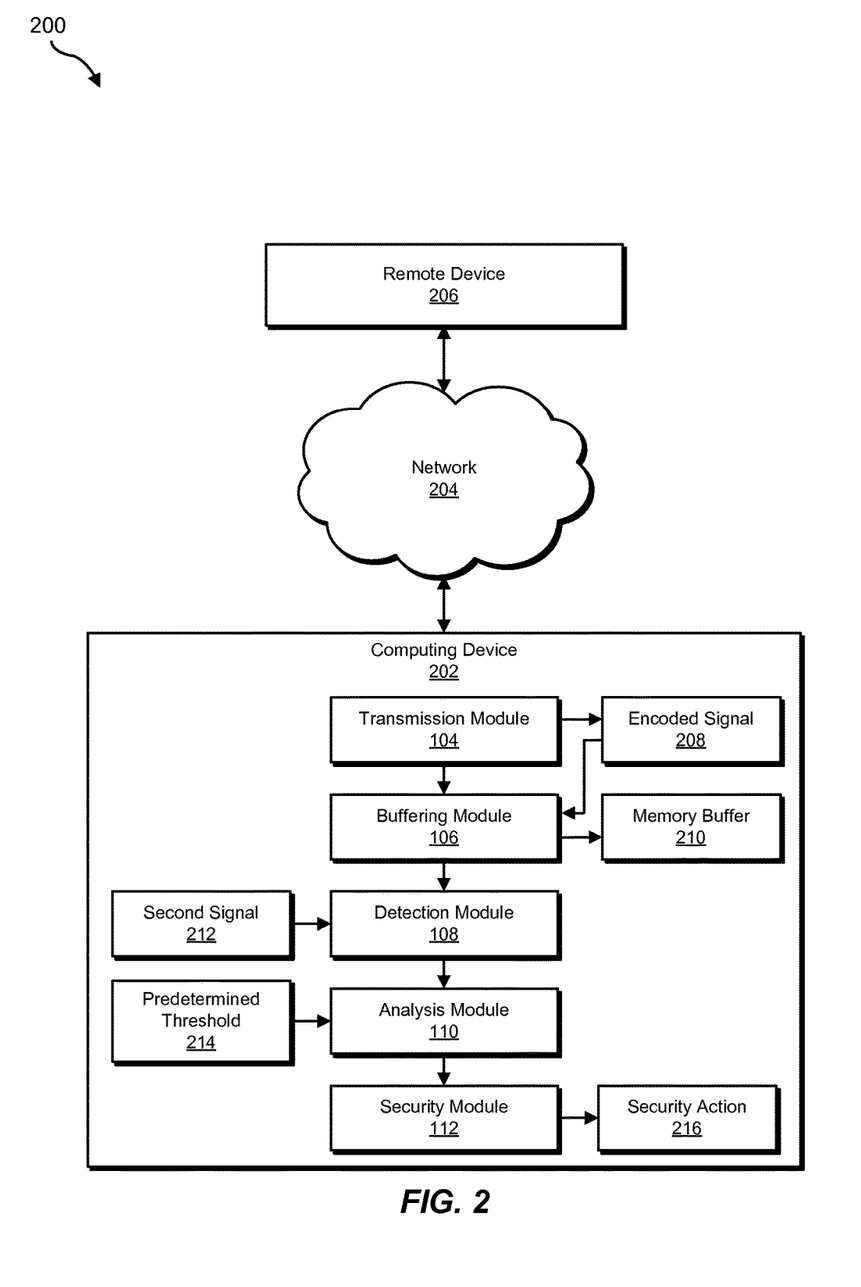
FIG. 2 is a block diagram of an additional exemplary system for defeating relay attacks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a remote device 206 via a network 204. In one example, computing device 202 may be programmed with one or more of modules 102. Additionally or alternatively, remote device 206 may be programmed with one or more of modules 102.

In one embodiment, one or more of modules 102 from FIG. 1 may, when executed by at least one processor of computing device 202 and/or remote device 206, enable computing device 202 and/or remote device 206 to defeat relay attacks. For example, and as will be described in greater detail below, buffering module 106 may buffer, in a memory buffer 210, an encoded signal 208 that has been sent to a remote device by transmission module 104. Detection module 108 may detect, within a time interval of encoded signal 208 being sent, a second signal 212 that corresponds to the encoded signal. Analysis module 110 may determine that a strength of second signal 212 is above a predetermined threshold 214. Analysis module 110 may determine, based on the strength of second signal 212 being above predetermined threshold 214, that second signal 212 represents a relay attack. Security module 112 may initiate a security action 216 to defeat the relay attack.

Computing device 202 and remote device 206 generally represent any type or form of computing device capable of reading computer-executable instructions. Examples of computing device 202 and remote device 206 include, without limitation, remote controls, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any wireless medium or architecture capable of facilitating communication or data transfer. Examples of network 204 include, without limitation, short-range wireless signals, various frequencies of radio signals, infrared signals, a cellular network (e.g., a Global System for Mobile Communications (GSM) network), exemplary network architecture 700 in FIG. 7, or the like. In one embodiment, network 204 may facilitate communication between computing device 202 and remote device 206.

Figure 3:
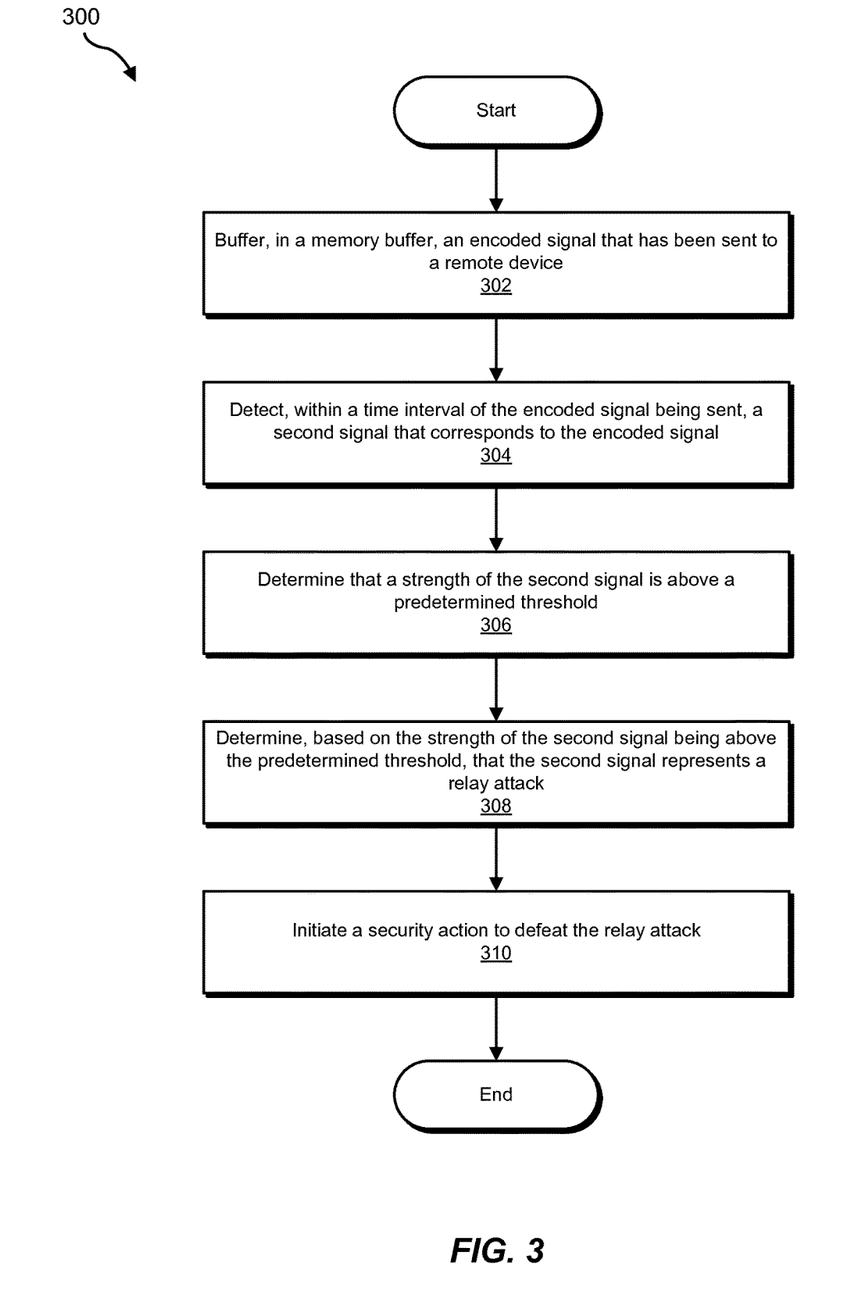
FIG. 3 is a flow diagram of an exemplary method for defeating relay attacks.

FIG. 3 is a flow diagram of an exemplary computer-implemented method 300 for defeating relay attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may buffer, in a memory buffer, an encoded signal that has been sent to a remote device. For example, buffering module 106 may, as part of computing device 202 in FIG. 2, buffer, in memory buffer 210, encoded signal 208 that has been sent to remote device 206. Encoded signal 208 may have been sent to remote device 206 by transmission module 104. As used herein, the term "memory buffer" may refer to any storage buffer, cache, and/or other data structure or mechanism for gathering and/or temporarily storing data.

The term "encoded signal," as used herein, generally refers to data transmitted via electromagnetic waves, such as radio waves or infrared light. Data may be encoded on the waves using frequency or amplitude modulation, phase shifting or any other suitable method. The data may also be encoded using a variety of codes or protocols, such as ASCII and/or Internet protocol (IP). The encoded data may also be encrypted using any suitable encryption protocol.

Buffering module 106 may buffer the encoded signal in a memory buffer in a variety of ways. For example, buffering module 106 may store an encoded signal in memory when (or before) it is transmitted and leave the signal in memory until the next signal is transmitted. In another example, buffering module 106 may use a block of memory to store several recently transmitted signals, overwriting the oldest signal when the memory block is fully utilized. In another example, buffering module 106 may use a block of memory to recreate a previously sent signal for comparison to a received signal.

At step 304, one or more of the systems described herein may detect, within a time interval of the encoded signal being sent, a second signal that corresponds to the encoded signal. For example, detection module 108 may, as part of computing device 202 in FIG. 2, detect, within a time interval of encoded signal 208 being sent, second signal 212 that corresponds to encoded signal 208.

Detection module 108 may detect a second signal that corresponds to the encoded signal in a variety of ways. For example, detection module 108 may listen for a time interval for a signal transmitted at the same frequency at which the encoded signal was sent. The time interval may vary, depending upon the application, the desired level of security, and/or the probability of detecting a false positive match for the encoded signal. Because the probability of success for a relay attack may decrease quickly over time, the time interval may be as short as one second. For an application deployed where a high level of security is desired, detection module 108 may listen for a signal corresponding to the encoded signal until the transmitting device transmits another encoded signal.

In some examples, detection module 108 may detect the second signal that corresponds to the encoded signal by comparing content of the second signal to content of the encoded signal in the memory buffer and determining that the content of the second signal is identical to the content of the encoded signal. Depending upon the communication protocol used, detection module 108 may compare either all or part of the content of the second signal to the content of the encoded signal. For example, detection module 108 may compare only the portion of the signals containing critical data, such as an operating instruction or a sequential code.

In one embodiment, the second signal may be received at a frequency of the encoded signal such that the second signal may interfere with reception of the encoded signal by the remote device. For example, detection module 108 may, as part of computing device 202 in FIG. 2, receive second signal 212 at a frequency that may interfere with the ability of remote device 206 to receive encoded signal 208.

The term "interfere," as used herein, generally refers to deliberately transmitting signals that jam or disrupt communication between the computing device and the remote device. For example, a device attempting to carry out a relay attack may transmit radio signals at the frequency used by the computing and remote devices. The interfering signals may contain random noise, pulses, stepped tones, or other noise capable of preventing the computing device and remote device from decoding signals transmitted between them.

For the device carrying out the relay attack to interfere with communication between the computing device and the remote device, the time interval between transmitting the encoded signal and receiving the second signal may necessarily be very short, such as a small fraction of a second. As will be described in greater detail below, a relay attack that involves interfering with communication between the computing device and the remote device may involve a different sequence of events than a relay attack on a computing device that is outside the communication range of the remote device.

At step 306, one or more of the systems described herein may determine that a strength of the second signal is above a predetermined threshold. For example, analysis module 110 may, as part of computing device 202 in FIG. 2, determine that a strength of second signal 212 is above predetermined threshold 214.

Analysis module 110 may determine that the strength of second signal 212 is above a predetermined threshold in a variety of ways. For example, analysis module 110 may obtain a signal strength threshold during a device calibration process, in which the computing device transmits a test signal and measures the strength of an echo of the test signal. Analysis module 110 may then calculate a predetermined threshold as a percentage above the measured value. In another example, analysis module 110 may use predetermined threshold that represents the expected signal strength of a signal echo under a set of assumed operating conditions for the computing device.

At step 308, one or more of the systems described herein may determine, based on the strength of the second signal being above the predetermined threshold, that the second signal represents a relay attack. For example, analysis module 110 may, as part of computing device 202 in FIG. 2, determine, based on the strength of second signal 212 being above predetermined threshold 214, that second signal 212 represents a relay attack.

Figure 4:
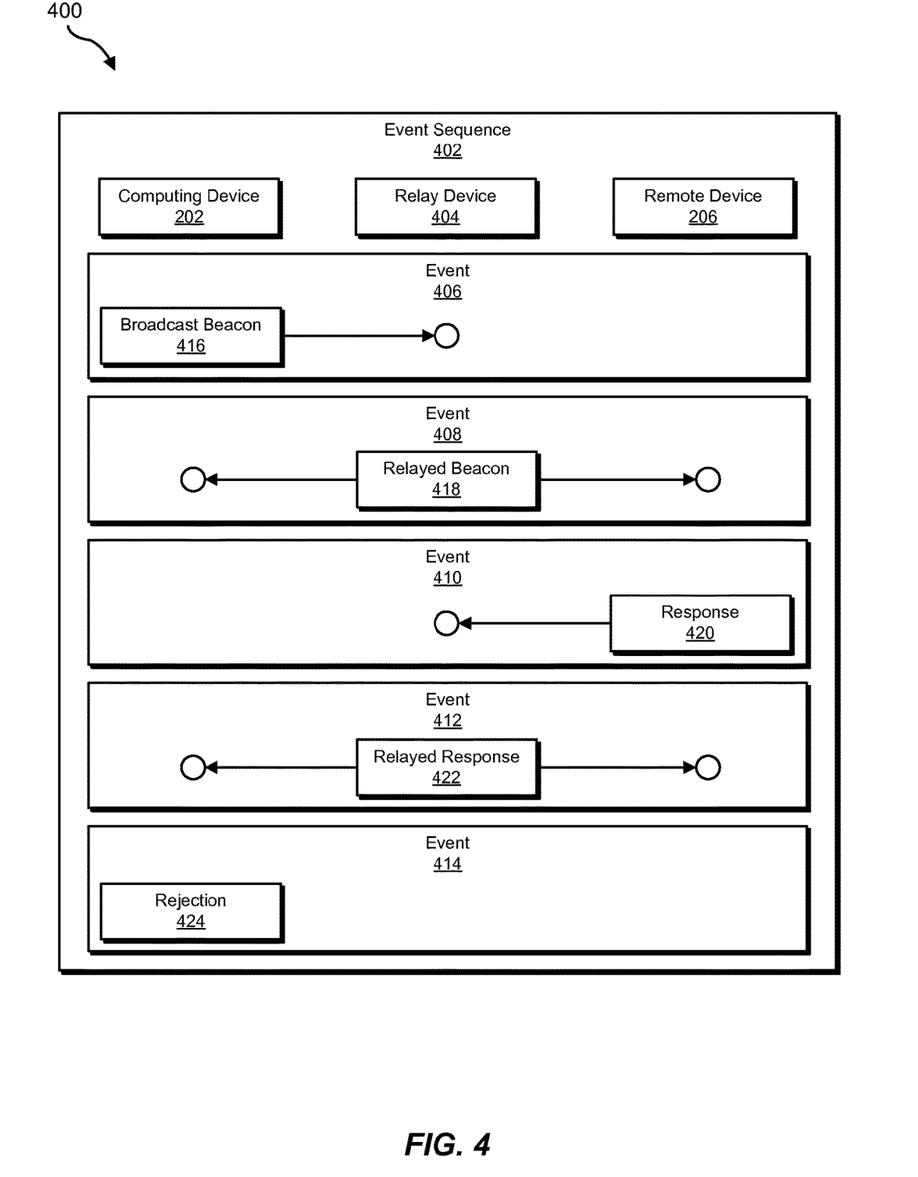
FIG. 4 is a block diagram of an exemplary relay attack event sequence.

Systems described herein may determine that detected signals represent a relay attack in a variety of ways. FIG. 4 is a block diagram of an exemplary relay attack event sequence 400. In one example, relay attack event sequence 400 represents a sequence of events that may occur with a relay attack on a vehicle with a remote keyless entry (RKE) system. In some RKE systems, when someone touches or pushes a button on a door handle, the RKE system in the vehicle (represented by computing device 202 in FIG. 5) transmits a broadcast beacon to determine whether a key fob for the vehicle (remote device 206) is in close proximity. If the key fob transmits a correct response, the RKE system unlocks the vehicle door. If the key fob is not within range, a relay device may relay the broadcast beacon and the response from the key fob to obtain unauthorized access.

Relay attack event sequence 400 may include event sequence 402, which includes signal communication events between computing device 202, relay device 404, and remote device 206. Event sequence 402 may begin with event 406, in which computing device 202 transmits broadcast beacon 416, which may be received by relay device 404, but for which remote device 206 may be beyond range. Event sequence 402 may continue with event 408, in which relay device 404 relays broadcast beacon 416 as relayed beacon 418, at a signal strength that may be received by both computing device 202 and remote device 206.

Event sequence 402 may continue with event 410, in which remote device 206 responds to relayed beacon 418 with response 420, which is received by relay device 404, but which may not be received by computing device 202. In event 412, relay device 404 may relay response 420 as relayed response 422, which may be received by both computing device 202 and remote device 206. Detection module 108, executing as part of computing device 202 in FIG. 2, may determine that the content of relayed beacon 418 matches the content of broadcast beacon 416. Analysis module 110 may compare the signal strength of relayed beacon 418 and determine that the signal strength is above the predetermined threshold. Event sequence 402 may conclude with event 414, in which analysis module determines that because the signal strength of relayed beacon 418 is above the predetermined threshold, that relayed beacon 418 represents a relay attack. As will be described in greater detail below, computing device 202 may then initiate rejection 424 of relayed response 422. Rejection 424 may include one or more security actions.

In one embodiment, systems described herein may detect a relay attack that uses signal interference. A relay attack that involves signal interference may produce a different sequence of events than occurs in event sequence 400 in FIG. 4. For example, detecting a signal interference relay attack may include (1) transmitting a second encoded signal to the remote device, (2) detecting, within a time interval of sending the second encoded signal, a third signal, where the third signal is received at the frequency of the second encoded signal and may interfere with reception of the second encoded signal by the remote device, and (3) detecting a fourth signal, where the content of the fourth signal is identical to the content of the encoded signal. For example, transmission module 104 may, as part of computing device 202 in FIG. 2, transmit a second encoded signal to remote device 206. Detection module 108 may detect a third signal within a time interval of sending the second encoded signal. As mentioned previously, the third signal may interfere with reception of the second encoded signal by remote device 206. Detection module 108 may detect a fourth signal with content identical to encoded signal 208.

Systems described herein may detect a relay attack that involves signal interference in a variety of ways. In one embodiment, the encoded signal includes a value in a code sequence and the second encoded signal includes a subsequent value in the code sequence. The term "code sequence," as used herein, generally refers to a sequence of values generated by an algorithm known to both the sending and receiving devices. For example, a remote control for a garage door opener may calculate and include a value in a code sequence when transmitting a signal to open the garage door. The opener has stored the value sent the previous time the door was opened, and can therefore calculate the next value in the code sequence. The opener compares the received value with the expected next value in the sequence to determine whether to open the door. Code sequences of this type are sometimes referred to as "rolling codes" or "hopping codes."

Figure 5:
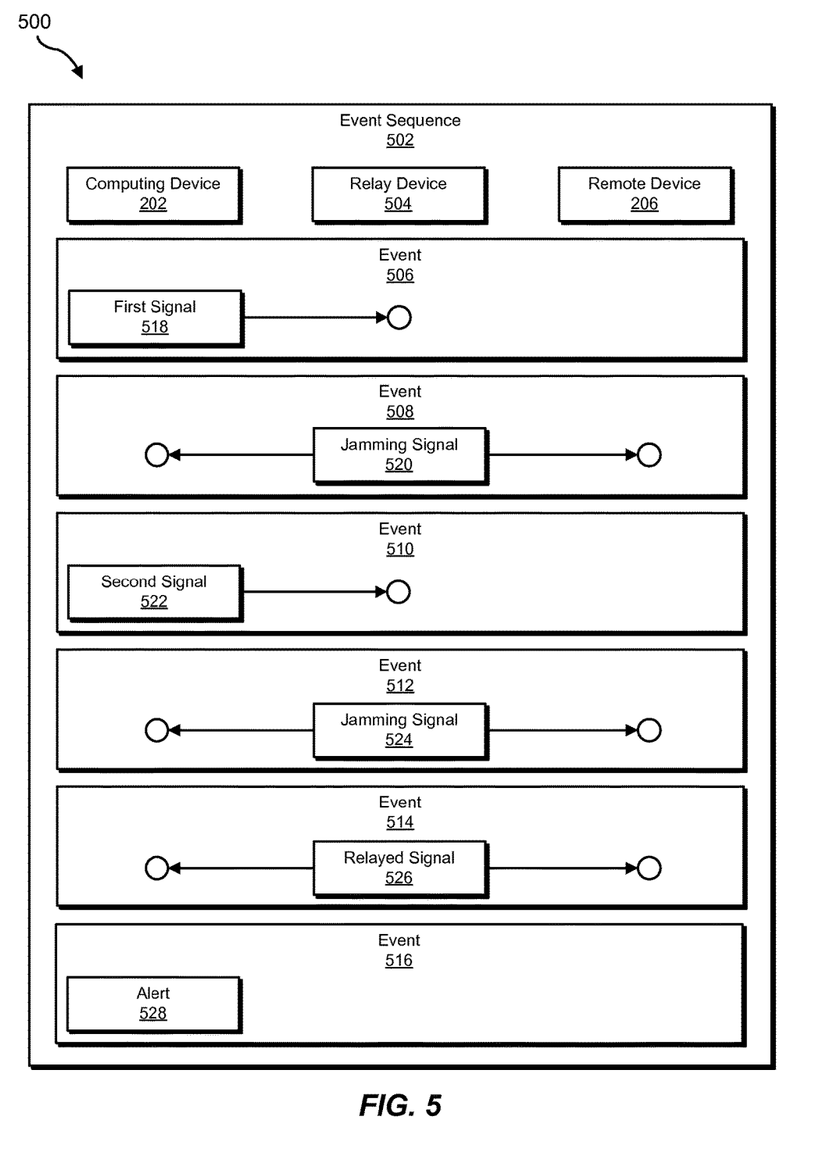
FIG. 5 is a block diagram of an exemplary relay attack event sequence.

FIG. 5 is a block diagram of an exemplary relay attack event sequence 500 for an attack involving signal interference. In one example, relay attack event sequence 500 may represent a sequence of events occurring in a relay attack on a garage door with a remote control. In normal operation, the remote control (represented by computing device 202 in FIG. 5) may transmit a signal that includes a sequential code. If the door opener (remote device 206) validates the transmitted code using its sequential algorithm, the door opener may open the door. As shown in FIG. 5, a relay device may jam and relay signals between the remote control and the door opener to obtain a signal containing the next valid sequential code, which may be used to open the door at a later time.

More generally, relay attack event sequence 500 may include event sequence 502, which may include signals transmitted between computing device 202, relay device 504, and remote device 206. Event sequence 502 may include event 506, in which computing device 202 transmits first signal 518, which may be received by relay device 504. First signal 518 may also be transmitted at a strength that may be received by remote device 206. Event sequence 502 may continue with event 508, in which relay device 504 transmits jamming signal 520, which may be received by computing device 202 and remote device 206. Jamming signal 520 may prevent remote device 206 from receiving first signal 518. Event sequence 502 may include event 510, in which, in response to first signal 518 not initiating the expected response from remote device 206, computing device 202 transmits second signal 522, which may be received by relay device 504. Event sequence 502 may continue with event 512, in which relay device 504 transmits jamming signal 524, which may be received by computing device 202 and remote device 206. Jamming signal 524 may prevent remote device 206 from receiving second signal 522.

After receiving first signal 518 and second signal 522, relay device 504 may have obtained two consecutive values in a code sequence used by computing device 202 and remote device 206. By transmitting jamming signal 520 and jamming signal 524, relay device 504 may prevent remote device 206 from receiving first signal 518 and second signal 522. Remote device 206 may therefore expect the next encoded signal received from computing device 202 to include the value in the code sequence sent in first signal 518. At event 514, relay device 504 may retransmit first signal 518 as relayed signal 526. Both computing device 202 and remote device 206 may receive relayed signal 526. Detection module 108 in computing device 202 may determine that the content of relayed signal 526 is the same as first signal 518. At event 516, computing device 202 may initiate alert 528, which may include a security action.

Returning to FIG. 3, at step 310, one or more of the systems described herein may initiate a security action to defeat the relay attack. For example, security module 112 may, as part of computing device 202 in FIG. 2, initiate security action 216 to defeat the relay attack.

Security module 112 may initiate any suitable security action to defeat the detected relay attack. For example, security module 112 may notify an administrator of the relay attack. Security module 112 may use any suitable form of communication to notify an administrator that a relay attack is in progress. For example, security module 112 may access a cellular network to send a text message or voice message to the administrator. In another example, security module 112 may broadcast an audible alarm. For example, security module 112, executing in a vehicle, may activate an anti-theft alarm to alert the owner or others close to the vehicle that an attempt to gain access to the vehicle is in progress. In another example, security module 112 may deny access to a function controlled by the computing device. For example, security module 112 may disable remote control access to an entry system. In another example, security module 112 may activate a secondary security system. For example, after a relay attack has been detected, security module 112 may require the user to enter a code on a keypad, provide a fingerprint scan, or use a key or proximity card to obtain access that would normally be provided by the short-range wireless control.

In one embodiment, systems described herein may include calculating, based on the strength of the second signal, an estimated distance of a signal relay device from the computing device. For example, security module 112 may, as part of a security action, use the measured strength of the second signal to estimate the distance of a signal relay device from the computing device. Because security module 112 may not have a means for directly detecting the signal strength at which the relay device transmitted the second signal, security module 112 may, in one embodiment, measure the strength of other signals to compare to the measured strength of the second signal. For example, security module 112 may measure the strength of echoes of the encoded signal and the second signal and then compare the difference between the strength of the two signals and their echoes to estimate how much closer the relay device may be to the computing device, as compared to the distance between the computing device and the object producing the echoes.

As described above, the systems and methods described herein may defeat relay attacks by comparing the content of received signals with the content or transmitted signals and by comparing the strength of received signals to a predetermined threshold. Systems and methods described herein may determine that a relay attack is in progress if a signal with the same content as a transmitted signal is received at a signal strength above the predetermined threshold. Upon determining that a relay attack is in progress, systems and methods described herein may initiate a variety of security actions to defeat the relay attack. Systems and methods described herein may defeat a variety of relay attacks, such as when a relay device retransmits signals to a receiving device out of range of the transmitting device, or when the relay device interferes with communications between the sending and receiving devices. Systems and methods described herein may also estimate the distance between a transmitting device and a relay device conducting a relay attack.

Figure 6:
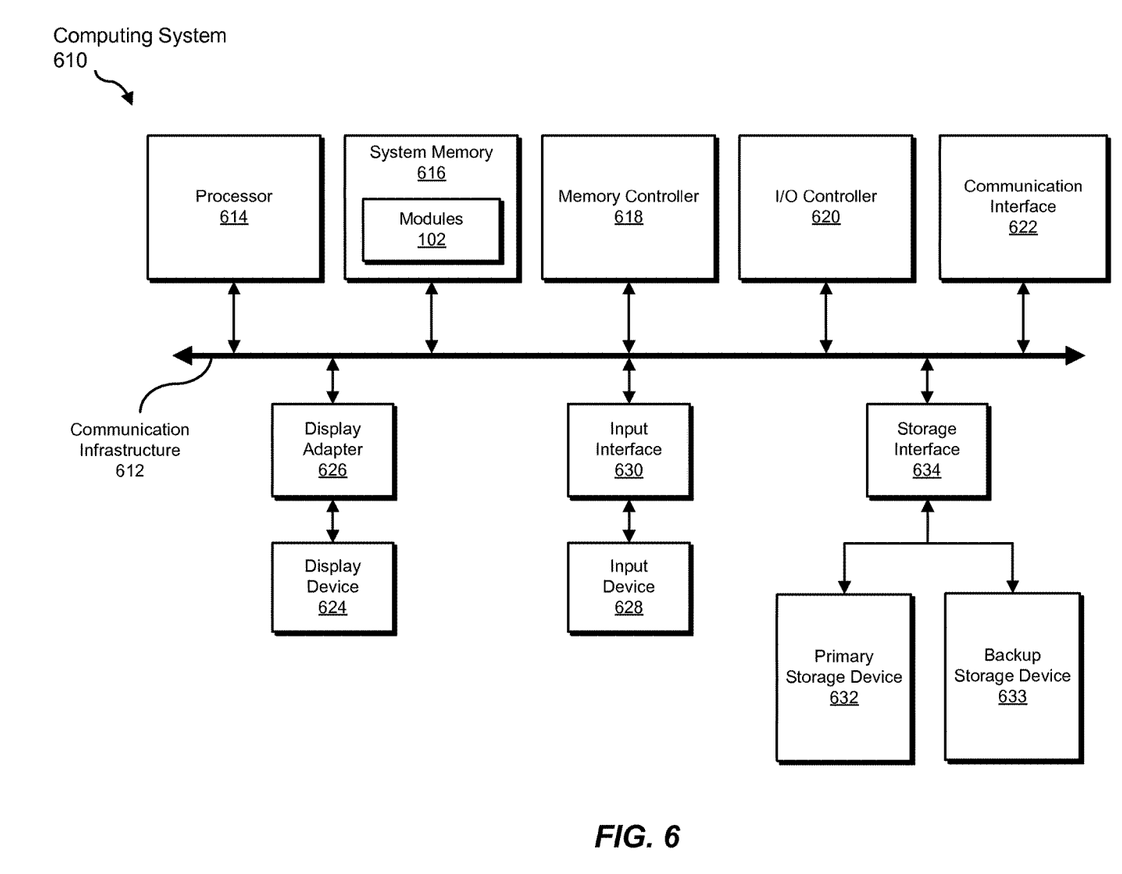
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
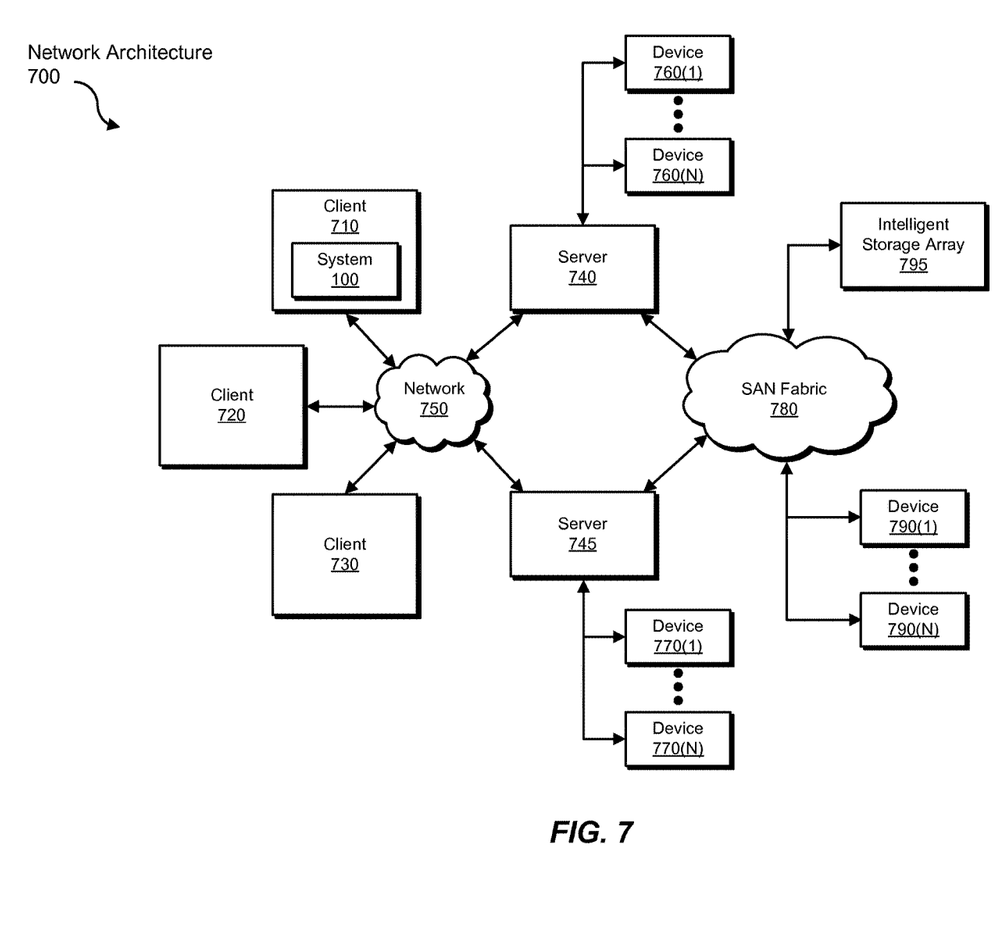
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for defeating relay attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive signals to be transformed, transform the signals, output a result of the transformation to determine the strength and content of the signals, use the result of the transformation to detect relay attacks, and store the result of the transformation to defeat relay attacks. One or more of the modules recited herein may transform a computing device to a device for defeating relay attacks. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for defeating relay attacks, at least a portion of the method being performed by a computing device comprising at least one processor, the method comprising:
 buffering, in a memory buffer, an encoded signal that has been sent from a computing device to a remote device;

detecting, within a time interval of the encoded signal being sent, a second signal that corresponds to the encoded signal;

determining that a strength of the second signal is above a predetermined signal strength threshold, which is calculated based on a strength of an echo of a test signal sent from the computing device;

determining, based on the strength of the second signal being above the predetermined signal strength threshold, that the second signal represents a relay attack;

initiating a security action to defeat the relay attack.

2. The computer-implemented method of claim 1, wherein detecting the second signal that corresponds to the encoded signal comprises:

comparing content of the second signal to content of the encoded signal in the memory buffer;

determining that the content of the second signal is identical to the content of the encoded signal.

3. The computer-implemented method of claim 1, wherein the second signal is received at a frequency of the encoded signal such that the second signal may interfere with reception of the encoded signal by the remote device.

4. The computer-implemented method of claim 3, further comprising:

transmitting a second encoded signal to the remote device;

detecting, within a time interval of sending the second encoded signal, a third signal, wherein the third signal is received at a frequency of the second encoded signal such that the third signal may interfere with reception of the second encoded signal by the remote device;

detecting a fourth signal, wherein a content of the fourth signal is identical to the content of the encoded signal.

5. The computer-implemented method of claim 4, wherein:

the encoded signal includes a value in a code sequence;

the second encoded signal includes a subsequent value in the code sequence.

6. The computer-implemented method of claim 1, further comprising calculating, based on the strength of the second signal, an estimated distance of a signal relay device from the computing device.

7. The computer-implemented method of claim 1, wherein the security action comprises at least one of:

notifying an administrator of the relay attack;

broadcasting an audible alarm;

denying access to a function controlled by the computing device;

activating a secondary security system.

8. A system for defeating relay attacks, the system comprising:

a buffering module, stored in memory, that buffers, in a memory buffer, an encoded signal that has been sent from a computing device to a remote device;

a detection module, stored in memory, that detects, within a time interval of the encoded signal being sent, a second signal that corresponds to the encoded signal;

an analysis module, stored in memory, that:

determines that a strength of the second signal is above a predetermined signal strength threshold, which is calculated based on a strength of an echo of a test signal sent from the computing device;

determines, based on the strength of the second signal being above the predetermined signal strength threshold, that the second signal represents a relay attack;

a security module, stored in memory, that initiates a security action to defeat the relay attack;

at least one physical processor configured to execute the buffering module, the detection module, the analysis module, and the security module.

9. The system of claim 8, wherein the detection module detects the second signal that corresponds to the encoded signal by:

comparing content of the second signal to content of the encoded signal in the memory buffer;

determining that the content of the second signal is identical to the content of the encoded signal.

10. The system of claim 8, wherein the detection module receives the second signal at a frequency of the encoded signal such that the second signal may interfere with reception of the encoded signal by the remote device.

11. The system of claim 10:

further comprising a transmission module, stored in memory, that transmits a second encoded signal to the remote device;

wherein the detection module:

detects, within a time interval of sending the second encoded signal, a third signal, wherein the third signal is received at a frequency of the second encoded signal such that the third signal may interfere with reception of the second encoded signal by the remote device;

detects a fourth signal, wherein a content of the fourth signal is identical to the content of the encoded signal.

12. The system of claim 11, wherein:

the encoded signal includes a value in a code sequence;

the second encoded signal includes a subsequent value in the code sequence.

13. The system of claim 8, wherein the security module calculates, based on the strength of the second signal, an estimated distance to a signal relay device.

14. The system of claim 8, wherein the security action comprises at least one of:

notifying an administrator of the relay attack;

broadcasting an audible alarm;

denying access to a function controlled by the system;

activating a secondary security system.

15. A non-transitory computer-readable medium comprising one or more computer-readable instructions that, when executed by at least one processor of a computing device, cause the computing device to:

buffer, in a memory buffer, an encoded signal that has been sent from a computing device to a remote device;

detect, within a time interval of the encoded signal being sent, a second signal that corresponds to the encoded signal;

determine that a strength of the second signal is above a predetermined signal strength threshold, which is calculated based on a strength of an echo of a test signal sent from the computing device;

determine, based on the strength of the second signal being above the predetermined signal strength threshold, that the second signal represents a relay attack;

initiate a security action to defeat the relay attack.

16. The non-transitory computer-readable medium of claim 15, wherein the one or more computer-readable instructions cause the computing device to detect the second signal that corresponds to the encoded signal by:

comparing content of the second signal to content of the encoded signal in the memory buffer;

determining that the content of the second signal is identical to the content of the encoded signal.

17. The non-transitory computer-readable medium of claim 15, wherein the second signal is received at a frequency of the encoded signal such that the second signal may interfere with reception of the encoded signal by the remote device.

18. The non-transitory computer-readable medium of claim 17, wherein the one or more computer-readable instructions cause the computing device to:
   transmit a second encoded signal to the remote device;
   detect, within a time interval of sending the second encoded signal, a third signal, wherein the third signal is received at a frequency of the second encoded signal and may interfere with reception of the second encoded signal by the remote device;
   detect a fourth signal, wherein a content of the fourth signal is identical to the content of the encoded signal.

19. The non-transitory computer-readable medium of claim 18, wherein:
   the encoded signal includes a value in a code sequence;
   the second encoded signal includes a subsequent value in the code sequence.

20. The non-transitory computer-readable medium of claim 15, wherein the one or more computer-readable instructions cause the computing device to calculate, based on the strength of the second signal, an estimated distance of a signal relay device from the computing device.

* * * * *